(12) United States Patent
Goldman et al.

(10) Patent No.: US 7,092,863 B2
(45) Date of Patent: Aug. 15, 2006

(54) MODEL PREDICTIVE CONTROL (MPC) SYSTEM USING DOE BASED MODEL

(75) Inventors: Arnold Goldman, Jerusalem (IL); Shlomo Sarel, Jerusalem (IL); Yehuda Hartman, Rechovot (IL); Yossi Fisher, Jerusalem (IL)

(73) Assignee: Insyst Ltd., Jerusalem (IL)

( * ) Notice: Subject to any disclaimer, the term of this patent is extended or adjusted under 35 U.S.C. 154(b) by 825 days.

(21) Appl. No.: 09/746,014

(22) Filed: Dec. 26, 2000

(65) Prior Publication Data
US 2002/0128805 A1 Sep. 12, 2002

(51) Int. Cl.
*G06G 7/62* (2006.01)
*G06F 7/60* (2006.01)

(52) U.S. Cl. ............... 703/13; 703/2; 703/6; 703/14; 700/28; 700/29; 706/10; 706/12; 706/23; 706/25

(58) Field of Classification Search ............... 703/2, 703/6, 13; 706/10, 12, 23, 25, 46, 5; 700/28, 700/29, 97
See application file for complete search history.

(56) References Cited

U.S. PATENT DOCUMENTS

| | | | |
|---|---|---|---|
| 4,970,658 A | | 11/1990 | Durbin et al. |
| 5,121,467 A | * | 6/1992 | Skeirik .............. 706/10 |
| 5,282,261 A | * | 1/1994 | Skeirik .............. 706/23 |
| 5,325,466 A | | 6/1994 | Kornacker |
| 5,377,308 A | * | 12/1994 | Inoue et al. .............. 706/52 |
| 5,440,478 A | | 8/1995 | Fisher et al. |
| 5,479,340 A | | 12/1995 | Fox et al. |
| 5,483,468 A | | 1/1996 | Chen et al. |
| 5,546,507 A | | 8/1996 | Staub |
| 5,640,493 A | * | 6/1997 | Skeirik .............. 706/25 |
| 5,691,895 A | * | 11/1997 | Kurtzberg et al. .............. 700/29 |
| 5,710,700 A | * | 1/1998 | Kurtzberg et al. .............. 700/29 |
| 5,740,033 A | | 4/1998 | Wassick et al. |
| 5,781,430 A | * | 7/1998 | Tsai .............. 700/28 |
| 5,787,425 A | | 7/1998 | Bigus |
| 5,862,054 A | | 1/1999 | Li |
| 5,875,285 A | | 2/1999 | Chang |
| 5,949,678 A | | 9/1999 | Wold et al. |
| 6,032,146 A | | 2/2000 | Chadha et al. |
| 6,073,138 A | | 6/2000 | de l'Etraz et al. |
| 6,134,555 A | | 10/2000 | Chadha et al. |
| 6,207,936 B1 | * | 3/2001 | de Waard et al. .............. 219/497 |
| 6,240,329 B1 | | 5/2001 | Sun |

(Continued)

FOREIGN PATENT DOCUMENTS

WO    WO 00/00874    1/2000

OTHER PUBLICATIONS

"DOE/Opt: A System for Design of Experiments, Response Surface Modeling, and Optimization Using Process of Device Simulation", D. Boning, IEEE Transactions on Semiconductor Manufacturing, vol. 7, No. 2, May 1994.*

(Continued)

*Primary Examiner*—Fred Ferris

(57) ABSTRACT

A system for automatic control of a process, comprising a process model using data and further comprising a data model for generating data for said process model and an empirical data extractor for extracting data from said process for said model, and wherein said data used by said process model is interchangeable between data obtained by said data model and data obtained by said extractor. The data model may be a partly statistical partly empirical orthogonal process model. The system is useful in allowing control systems using empirical prediction methods to perform automatic control before having built up a full results database.

29 Claims, 7 Drawing Sheets

U.S. PATENT DOCUMENTS

| | | | |
|---|---|---|---|
| 6,249,712 B1 | | 6/2001 | Boiquaye |
| 6,263,255 B1 | | 7/2001 | Tan et al. |
| 6,304,836 B1 | * | 10/2001 | Krivokapic et al. .......... 703/14 |
| 6,373,033 B1 | * | 4/2002 | de Waard et al. ........... 219/497 |
| 6,381,564 B1 | * | 4/2002 | Davis et al. .................. 703/22 |
| 6,532,454 B1 | * | 3/2003 | Werbos ........................ 706/14 |
| 6,546,522 B1 | * | 4/2003 | Chen ............................. 716/2 |
| 6,725,112 B1 | * | 4/2004 | Kaminsky et al. ............ 700/97 |
| 6,766,205 B1 | * | 7/2004 | Williams et al. .............. 700/97 |
| 6,766,283 B1 | * | 7/2004 | Goldman et al. .............. 703/2 |
| 6,820,070 B1 | * | 11/2004 | Goldman et al. ............. 706/46 |
| 6,952,688 B1 | * | 10/2005 | Goldman et al. ............. 706/45 |
| 2001/0049595 A1 | | 12/2001 | Plumer et al. |
| 2001/0054032 A1 | * | 12/2001 | Goldman et al. ............. 706/12 |

OTHER PUBLICATIONS

"Design of Experiment is the best way to Optimize a Process at Minimal Cost", S. Kumar, IEEE/CHMT '90 IEMT Symposium, p. 166-173, IEEE 1990.*

"A New Methodology of Using Design of Experiments as a Precursor to Neural Networks for Material Processing: Extrusion Die Design", B. Metha, IEEE 0-7803-5489-Mar. 1999, IEEE 1999.*

"Design of Experiments: A Tool for Continous Process Imporvement".*

"Conducting Experiments With Experiment Manager", M. Angel, pp. 535-541, Proceedings 1996 Winter Simulation Conference ACM 1996.*

"Validation of Models: Statistical Techniques and Data Availability", Kleijnen, Proceedings 1999 Winter Simulation Conference, pp. 647-654, ACM 199.*

"Design of Experiments in BDD Variable Ordering: Lessons Learned", Harlow et al, ICCADA 98', pp. 646-652, ACM 1998.*

Constructivist Foundations of Modeling—A Kantian Perspective, Marco C. Bettoni, Internat. Journal of Intelligent Systems, vol. 12, No. 8, Aug. 1998, pp. 577-595.

Knights Technology, Inc. at-a-Glance, http://www.knights.com/ktglance.htm [18-pages].

Work in Progress: Visual Specification of Knowledge Bases, Gavrilova, et al http://www.csa.ru/Inst/gorb_dep/artific/IA/ben-last.htm [8-pages].

Object Space Solutions for a Connected World, http://www.ObjectsSpace.com/products/prodCatalyst.asp [11-pages].

Adventa Corporate Overview, http://www.adventact.com/corporat.htm [28 pages].

Domain Manufacturing, http://www.domainmfg.com/mfg/starfire/industry-specific-auto.htm [10 pages].

HPL Corporate http://www.hpl.com/Corporate/history.htm [6 pages].

SEMY Engineering Home Page http://www.semy.com [9 pages].

KLA-Tencor: Leading the Yield Management Market http://www.tencor.com [15 pages].

Yield Dynamics, Inc. http://www.ydyn.com/products/yield.htm [9 pages].

Artificial Intelligence and Manufacturing: A Research Planning Report, Leslie D. Interrante Aug. 8, 1997, http://sigmans.cs.umn.edu/sigmanwrk/report96.htm [34 pages].

On the Epistemology and Management of Electronic Design Automation Knowledge, Scott et al, http://www.azstarnet.com/'scottmc/medak/Epistermology.htm [17 pages].

Army Medical Knowledge Engineering System (AMKES)—A Three-Tier Knowledge Harvesting Environment, Merritt et al, Practical Applications of Java 1999 Conference Proceedings, http://amzi.harvard.net/articles/amkes_pajava99.htm [7 pages].

Final Model Business Case Report for the OSD CALS IWSDB Project, An MVP Joint Venture, ManTech International Corporation, Dec. 2, 1994, Kidwell et al., http://www2.dcnicn.com/cals/iwsdb/task07/html/a024/Fmodbus1.htm [77 pages].

Computer Aided Knowledge Engineering, British Steel, Mackenzie, http://www.cogsys.co.uk/cake/CAKE-TestSite-BS.htm [12 pages].

* cited by examiner

Fig. 4

MODEL PREDICTIVE CONTROL (MPC) SYSTEM USING DOE BASED MODEL

FIELD OF THE INVENTION

The present invention relates to a model predictive control system that uses a statistical model and more particularly but not exclusively to such a system using a Design of Experiments (DOE)-based statistical model for example in a manufacturing control system that uses empirical data as part of an automatic process control (APC) model.

BACKGROUND OF THE INVENTION

Automatic process control as a means of controlling the conditions under which a process is carried out is well known. For many years, simple and then steadily more complex closed loop control has been introduced. The control loop uses a formula or model to relate a process output to one or more inputs and, as the output varies, feedback is used to alter the inputs to ensure that the output stays on track.

Certain processes, however, require large numbers of variables having complex relationships therebetween to be incorporated into a model for effective control. In particular some of the variables involved may be variables that are not changeable by a feedback signal, such as the quality of an input product. In such circumstances a fully comprehensive model is difficult to build. Such a fully comprehensive model may be particularly useful in the event that extremely high quality is required in the resulting product. An example is silicon wafer production.

A model is essentially an educated guess as to the relationship between an output and one or more system inputs, The model is required to predict the behavior of the process under different input parameters. Accurate prediction is required if the process is to be controlled to produce desired results. Thus, methods of deriving a model may be referred to as prediction methods.

A particularly useful group of prediction methods comprises what are known as empirical prediction methods. In empirical prediction methods, existing process data, that is to say actually measured inputs and outputs, are utilized to define the model. Different methods use different ways of analyzing the data and incorporating it into a model to arrive at a prediction of an output for any given set of input parameters. The term "data" is used herein to refer inter alia to the quantification of any observable parameter regarding the process.

Applicant's previously filed application no. U.S. Ser. No. 09/689,884 concerns a manufacturing control system, known as a process output empirical modeler (POEM) that uses an empirical prediction method to provide a model as a basis for APC to operate a process, in particular a factory-based production process, The model divides both input and output parameters into discreet sections, builds vectors of all reasonable combinations of the different discrete sections of the input parameters and uses empirical data to associate each of the vectors with a statistical average of actual outputs corresponding to the given vector. The vectors, with their corresponding results are then placed in the form of a lookup table and used in APC as part of a control process that optimizes the inputs that can be varied, in the light of the inputs that cannot be varied, to arrive at a desired result.

Another empirical method that may be used is the method of classification and regression trees, CART. The skilled person will be aware of numerous other methods that makes use of empirical information and to which the present considerations are applicable, such as CHAD and Neural Nets.

A disadvantage of the above system, and indeed of any system requiring statistically significant empirical data, is that it requires relatively large amounts of data before it can begin to run effectively. Furthermore, it is not sufficient to have a large quantity of data. It is additionally necessary to have a good scatter of data across the input space. Certain parts of the input space may be utilized only rarely and it may require a very large number of experiments to effectively fill rarely used parts of the input space. In the case of POEM for example, each input vector should preferably have a statistically significant set of outputs that can be processed to provide a meaningful average output for the given vector.

The data to be relied upon may often be user specific, as different manufactures, even if making the same product, may often insert their own proprietary variations to the process, or may use input materials from different sources, which input materials may behave slightly differently in the process. Manufacturers are not generally willing to provide data sets to their competitors, and system manufacturers generally do not carry out the process and thus do not have their on independent data sets, to sell along with the system.

For all of the above reasons, providers of the system are generally unable to provide meaningful datasets with the systems.

Thus each new purchaser of a system is required to develop his own data set, and until he has done so the system cannot be used effectively. The number of process results required to provide statistically significant coverage of the entire input space is often very high, especially where there are large numbers of parameters involved. Depending on the process, individual experiments may be expensive or time-consuming or both

SUMMARY OF THE INVENTION

The present invention is concerned with the problem of providing a robust model that may allow operation of the system prior to the user having been able to obtain a statistically significant data set.

According to a first aspect of the present invention there is thus provided a system for automatic process control comprising an empirical prediction model of a process having an input space comprising input boundaries, the model requiring empirical data, and wherein at least some data for the empirical prediction model is simulated data.

Preferably, the simulated data is data obtainable from a first formula describing the process.

Preferably, the first formula is obtainable by regression from a data set of experimental results of the process run at least at its input boundaries.

Preferably, the simulated data is obtainable from, said first formula at desired points across said input space.

Preferably, the data set comprises the results of experiments having input conditions and whose input conditions are definable by a geometric spacing of said experiments across said input space.

Preferably, the geometric spacing is selectable to give an even spread of experiments across said input space.

Preferably, the geometric spacing is selectable to cover at least the input boundaries and a center of the input space.

Preferably, the geometric spacing is in accordance with DOE predetermined placing rules.

Preferably, the first formula is any one of a group comprising a linear formula, a linear formula with interaction between inputs, a quadratic formula and a quadratic formula with interaction between inputs.

Preferably, the input space is divisible into discrete regions, and wherein said empirical model comprises predicted process outputs associated with each discrete region.

In an embodiment, the outputs are process outputs,

Preferably, results for said predicted outputs are producible by said first formula and obtainable from running said process, said results being interchangeable within said empirical model.

The system preferably further comprises an empirical results quantity assessor for interchanging results produced by said first formula with results obtained from running said process when said results obtained from running said process are assessed to be statistically significant according to at least one predetermined criterion of significance.

Preferably, the system has a prediction quality assessor for interchanging results obtained by running said process with results obtained from said first formula when a prediction of said empirical model is assessed to diverge significantly from an outcome of said process according to at least one predetermined criterion of significance.

The system preferably comprises a process model using data and a data model for generating data for said process model and an empirical data extractor for extracting data from said process for said model. Preferably, said data used by said process model is interchangeable between data obtained by said data model and data obtained by said extractor.

Preferably a prediction quality assessor interchanges results obtained by said extractor with results obtained from said data model when a prediction of said process model is assessed to diverge significantly from an outcome of said process according to at least one predetermined criterion of significance.

A preferred embodiment comprises an empirical results quantity assessor for interchanging results produced by said data model with results obtained by said extractor when results obtained from running said process are assessed to be statistically significant according to at least one predetermined criterion of significance.

Preferably, said process model is a lookup table.

The lookup table preferably comprises output values for discrete regions of an input space within which said process id operable.

The data model is preferably a formula obtainable from outputs of said process associated with geometrically spaced points of an input space within which said process is operable.

Preferably, said formula is any one of a group comprising a linear formula, a linear formula with interactions, a quadratic formula and a quadratic formula with interactions.

Preferably, geometrically spaced points are evenly distributable about said input space.

Preferably, said geometrically spaced points comprise points placed on the boundaries of said input space and a point placed at a center of said input space.

According to a second aspect of the invention there is provided a method of automatically controlling a process, using a data-based process model comprising the steps of generating data for said process model using a data generation formula, and controlling said process using said generated data in said process model.

Preferably the process has input space and said data generation formula is obtained by running said process at preselected points in said input space.

Preferably, the preselected points are orthogonally placed in said input space.

Preferably, the preselected points are evenly spaced in said input space.

Preferably, at least some of said preselected points are placed at boundaries and a center of said input space.

A preferred embodiment further comprises a step of replacing said generated data with data empirically obtained during the running of the process.

Preferably, the step of replacing said generated data is carried out when said data obtained empirically has reached a threshold of significance according to at least one predetermined significance criterion.

A preferred embodiment comprises a further step of reverting to data generated using a data generation formula.

Preferably, said step of reverting is carried out when results predicted by said data-based process model are detected to diverge from empirically measured process results by an amount exceeding a threshold of significance according to at least one predetermined significance criterion.

A further preferred embodiment uses an evolutionary approach to find an optimal operating region. The embodiment begins operating at a first input space, and if unsatisfied with the results achieved finds a further input space. Output results obtained in the second input space are compared with the first and used to determine whether or not to move to a new operating area or input space. Such an embodiment comprises the steps of building a formula for a first input space, obtaining process output for said first input space, building a formula for a second input space, obtaining process output data for said second input space, comparing said process output data for said second input space with process output data for said first input space, on the basis of said comparison selecting a third input space for obtaining process output data, and operating said process in an optimal one of said input spaces.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention the description taken with the drawings making apparent to those skilled in the art how the several forms of the invention may be embodied in practice. In the accompanying drawings:

FIG. 4 is a simplified screen display showing a table of experiments that may typically be recommended for building a model in the process of FIG. 1.

DESCRIPTION OF THE PREFERRED EMBODIMENTS

Figure 1:
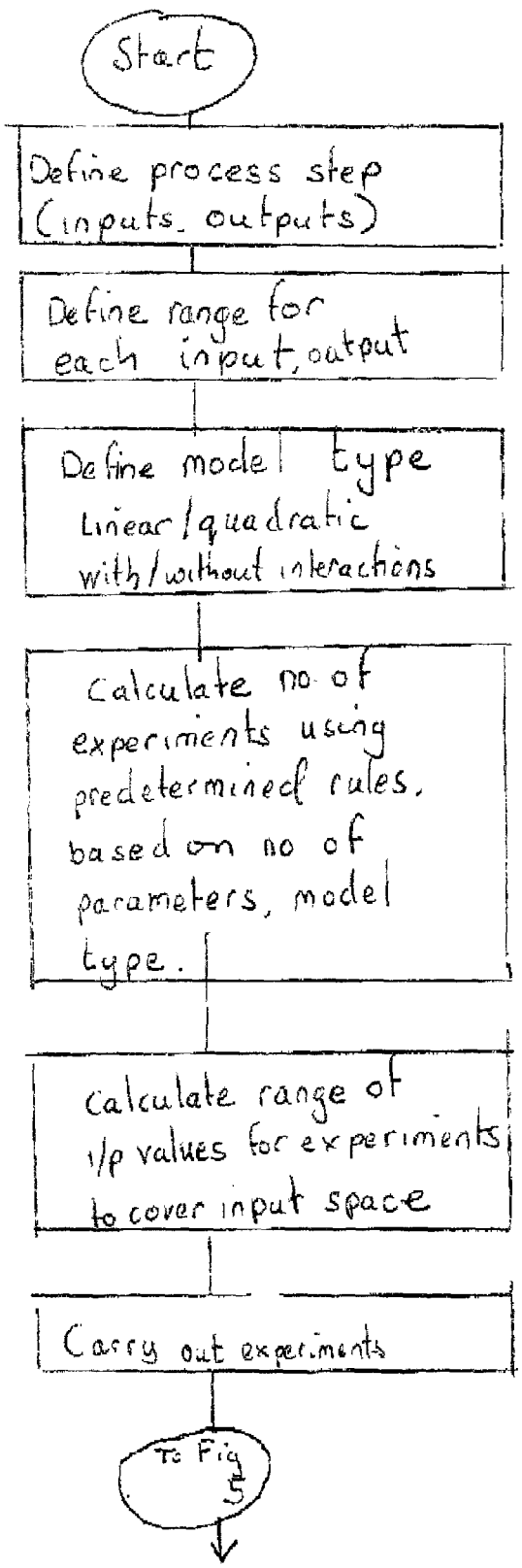
FIG. 1 is a simplified flow diagram of a process for building a useful model to simulate empirical data.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also it is to be understood that the phraseology and terminology employed herein is for the purpose of description and should not be regarded as limiting.

In the preferred embodiment of the present invention, a process or process step is taken and defined in terms of significant input and output parameters. The parameters are then related using a model type, for example linear, linear with interactions, quadratic, and quadratic with interactions. The number of parameters plus the model type preferably allows the calculation of how many experiments should be performed. Subsequently the system suggests input parameters for each of the experiments in such a way that result data representing the entire spread of the input space may be efficiently obtained. Essentially the process is operated in different combinations of its extreme operating points for each of the input parameters in such a way as to permit extrapolation across the entire input space.

The user is then encouraged to carry out the recommended experiments and record the results. The results are processed using a mathematical method called regression to expand the results from the extremes to cover the entire input space in a meaningful manner. The expanded results are then used as the raw data in a empirical method such as POEM.

In this way the empirical method may be used after only a small number of results have been obtained, depending on the number of inputs and the way in which they are related. The generation of a full set of empirical data results with statistically significant data for all sectors of the input space, by contrast, may take a significant length of time.

Reference is now made to FIG. 1, which is a simplified flow diagram showing a procedure for obtaining data suitable for empirical prediction methods, operable in accordance with a first embodiment of the present invention.

In FIG. 1, a process step is first defined in terms of a series of inputs and outputs. An input is given a name, and is defined to be of any one of a number of types. The types may be "measurable" meaning that the input can be measured by the automatic process control (APC) but cannot be altered by it. Alternatively, the input may be of type "controllable", meaning that not only can it be measured but that it can be controlled by the APC. The input is then associated with a unit type. For example, fine length measurements may be defined in terms of angstroms of microns.

Each of the inputs may then be associated with a measurement range. The range is preferably defined in terms of a maximum expected or permitted level and a minimum expected or permitted level.

If there is more than one output associated with any given input, then the input may be associated independently with each of two different output levels. This is for example achievable by associating the input with different weightings for each of the associated outputs.

Likewise, one or more outputs are defined, again in terms of a measurement unit and a range. The range may be inserted with upper and lower limits as was done with the inputs or alternatively a simple range having a numerical value but not having upper or lower limits may be entered.

Figure 2:
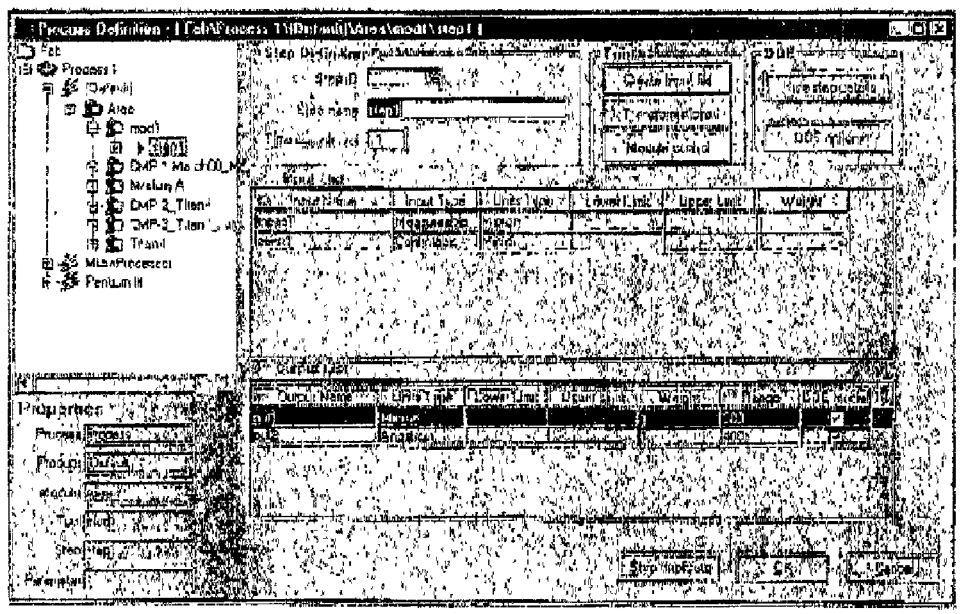
FIG. 2 is a simplified screen display for use in defining inputs and outputs for preparation of a model in the process of FIG. 1.

Reference is now made to FIG. 2, which is simplified diagram showing the layout or a computer screen for defining a process step as described above. The screen shows definitions being entered for a step, step 1, of a process, process 1. The step comprises a first input, meas1, of type "measurable" having units of microns, and a second input, contr1, of type "controllable", having units of angstroms. Lower and upper range limits are not shown.

Likewise, the step comprises two outputs, out1 and out2, having units respectively of microns and angstroms, and ranges respectively of 300 microns and 400 angstroms.

Returning now to FIG. 1, and the step of defining a range for each input and for each output is followed by a step of defining a relationship between the inputs and the outputs. The types of relationships that may typically be available are summarized below in table 1. Other types of relationships are possible, as the skilled person will be aware.

TABLE 1

Typically available model types

| Model | Description |
|---|---|
| Linear without interactions | Shown below is a simplified example of a linear model without interactions.<br><br>$Y = b_0 + b_1X_1 + b_2X_2 + b_3X_3$ (Linear)<br><br>This type of model entails the smallest number of experiments. The fewer the experiments, the less accurate the model will be. To be used only when neither quadratic behavior nor interactions are expected. |
| Linear with interactions | Shown below is a simplified example of a linear model with interactions.<br><br>$Y = \underbrace{b_0 + b_1X_1 + b_2X_2 + b_3X_3}_{\text{Linear}} + \underbrace{b_{12}X_1X_2 + b_{13}X_1X_3 + b_{23}X_2X}_{\text{Interactions}}$<br><br>Use only when quadratic behavior is not expected. |
| Quadractic without interactions | Shown below is a simplified example of a quadractic model without interactions.<br><br>$Y = \underbrace{b_0 + b_1X_1 + b_2X_2 + b_3X_3}_{\text{Linear}} + \underbrace{b_{11}X_1^2 + b_{22}X_2^2 + b_{33}X_3^2}_{\text{Quadradic}}$<br><br>For use only when quadractic behavior is expected, but without interactions. |
| Quadratic with interactions | Shown below is a simplified example of a quadratic model with interactions.<br><br>$Y = \underbrace{b_0 + b_1X_1 + b_2X_2 + b_3X_3}_{\text{Linear}} + \underbrace{b_{12}X_1X_2 + b_{13}X_1X_3 + b_{23}X_2X_3}_{\text{Interactions}} +$<br>$\underbrace{b_{11}X_1^2 + b_{22}X_2^2 + b_{33}X_3^2}_{\text{Quadradic}}$<br><br>For use when expecting quadratic behavior with interactions, or when unsure of the model behavior. This model requires the most experimentation, and provides the most accurate model. |

As show in table 1, a linear model without interactions is the simplest type of relationship between the inputs and the outputs. The model requires the least amount of experimentation to provide statistically significant data. The most complicated model type shown is the quadratic relationship with interactions. It requires the largest number of experiments in order to obtain sufficient data to determine the model coefficients. The quadratic relationship with interactions is a particularly preferred mathematical approximation for a typical process and is the model type that is ideally selected when nothing is known about the relationship to be modeled.

In table 1, linear and quadratic models only are shown. It is also possible to be use cubic and higher order models should the process to be controlled require it. However, cubic and higher order models are used only rarely in process control.

Following the selection of the most appropriate model type, it is possible to suggest a recommended number of experiments. The recommended number is calculated using predetermined rules based on the selected model type and the number of inputs. The way in which the number of experiments is calculated is part of the DOE procedure and will be described in greater detail at the end of this description with reference to FIGS. 9 to 13.

Figure 3:
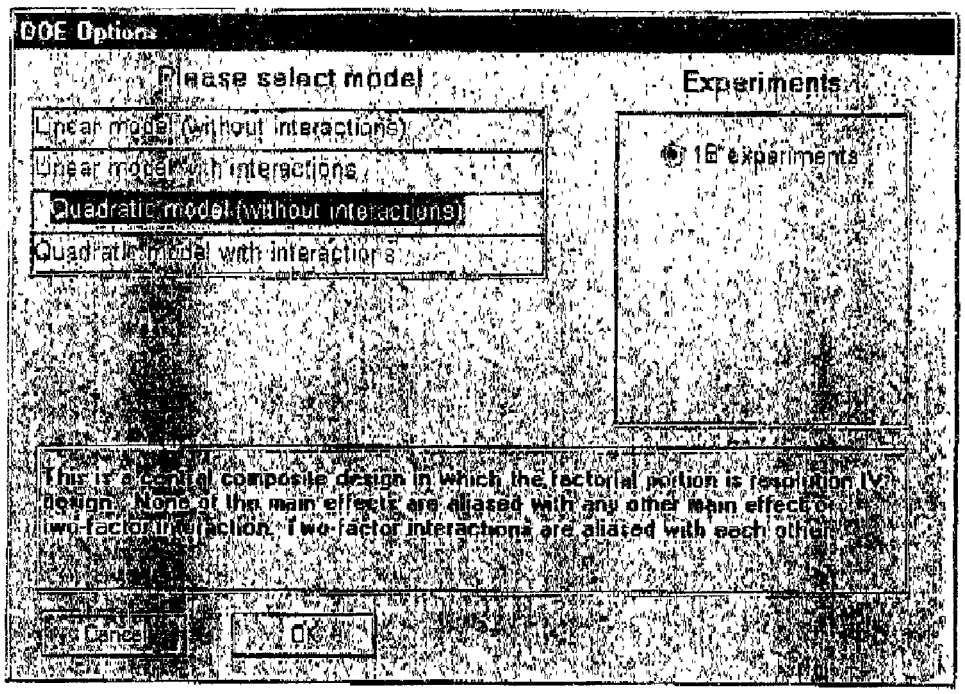
FIG. 3 is a simplified screen display for use in defining a type of model in the process of FIG. 1.

Reference is now made to FIG. 3, which shows a generalized screen display for selecting a mode. In the display, the four available model types are shown, and the desired selection is highlighted. Under a heading "Experiments" is shown a recommended number of experiments that has been calculated based on the selected model type and the number of inputs defined earlier. In this case the recommended number shown is 18.

Figure 4:
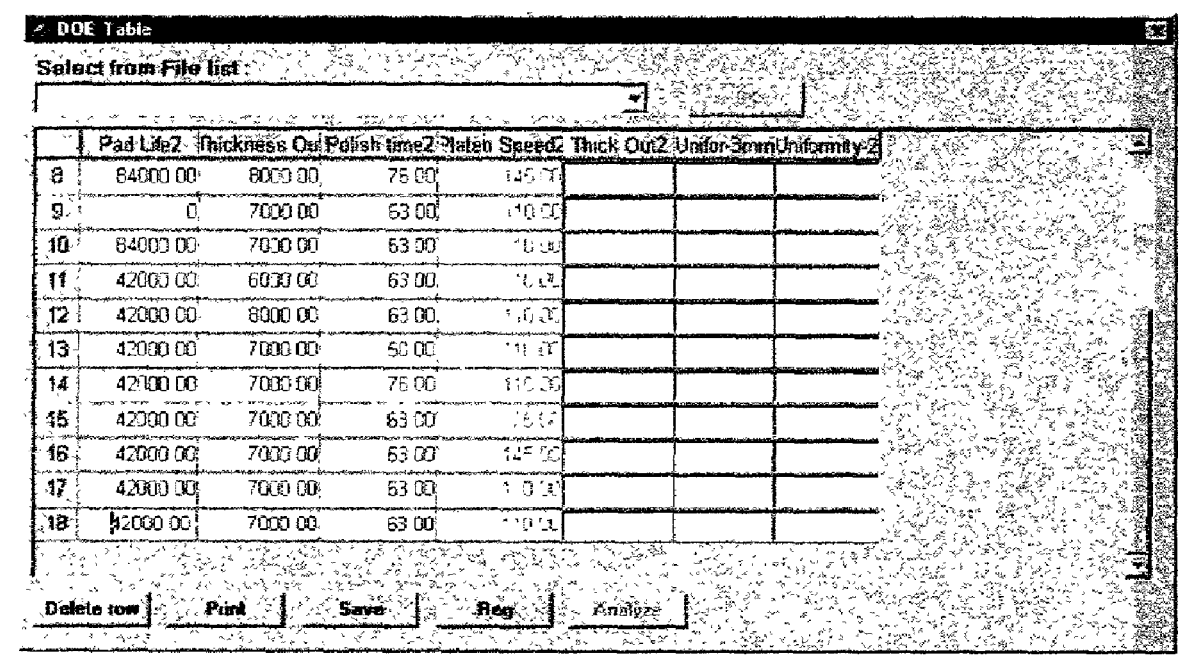

Returning again to FIG. 1, and the system now recommends input values to be used for each of the recommended experiments. The input levels are selected so as to be scattered in an effective manner around the whole space. This includes running the process at its extremes for each of the input variables. The results are preferably provided as a table, each row representing a different experiment. Such a table is shown in FIG. 4, with spaces for entering output values.

The process is preferably carried out for each on e of the recommended experiments and the results obtained are entered into the table.

Figure 5:
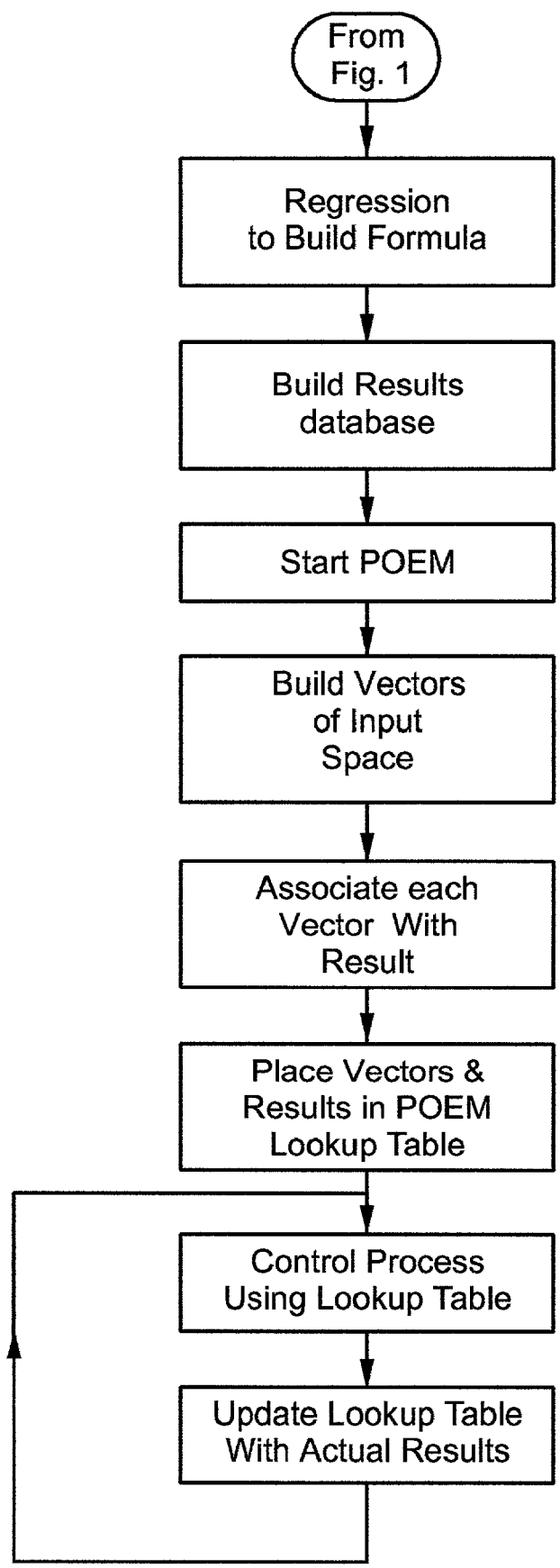
FIG. 5 is a simplified flow diagram showing the continuation of the process of FIG. 1, and detailing the building of a model for simulating empirical data followed by use of the data for building a model for automatic process control.

Reference is now made to FIG. 5, which is a simplified flow diagram showing how the data obtained from the experiments described with reference to FIG. 1 may be used to form a lookup table for the POEM empirical method.

Figure 6:
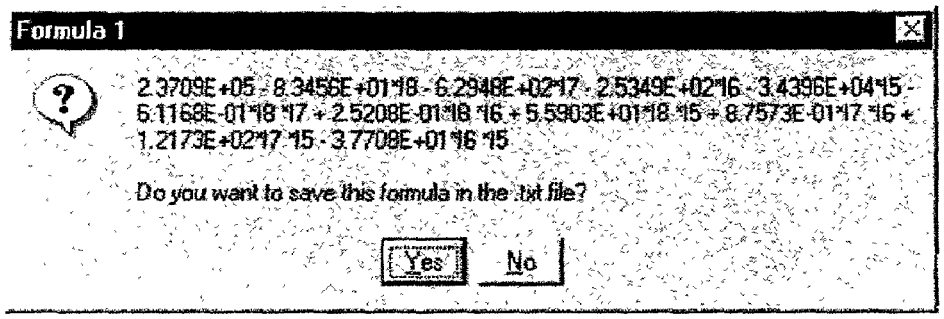
FIG. 6 is a screen display showing a typical model for simulating empirical data that may be produced by the process of FIG. 5.

In FIG. 5, a mathematical stage of regression is carried out to calculate a formula that describes the process output in terms of the inputs. More precisely, regression involves the taking of the formula of the model type selected previously and deriving coefficients for each of the terms so as best to fit the input data with the observed outputs FIG. 6 shows a typical series of coefficients that may be generated in this way.

Once the formula is available, it may be used to build a full statistical results database by calculating outputs across the whole of the input space. As mentioned above, DOE experiments are preferably carried out at least at all of the extreme points of operation of the process. Thus preferably none of the output calculations involves extrapolation of data outside the area in which experimentation has been carried out, giving additional validity to the results.

Figure 7:
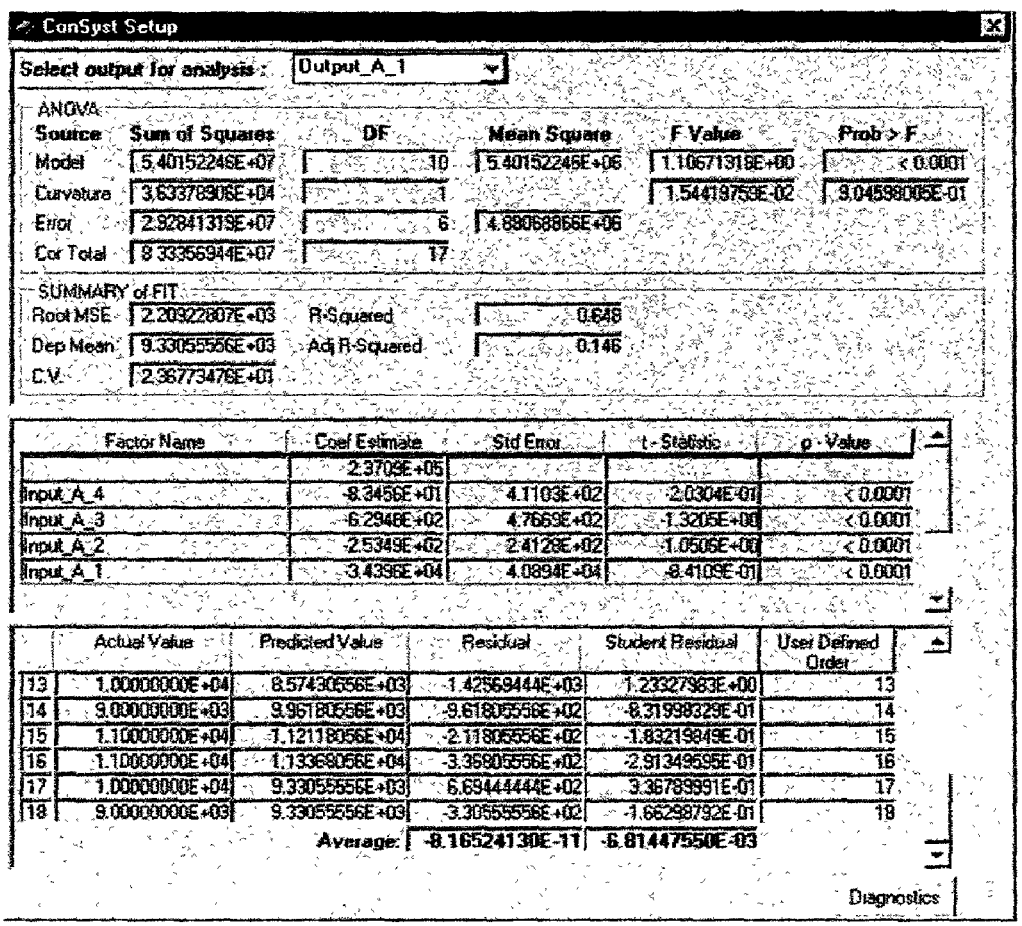
FIG. 7 is a typical screen display showing various statistical tools and data that may be used to study a formula such as that of FIG.5

Reference is now briefly made to FIG. 7, which is a simplified diagram showing statistical data which may be used to verify the quality of the formula obtained. The use of the data shown is apparent to the skilled person and is not described in further detail.

In the following, the use of the results database for POEM is explained, although it will be appreciated by the reader that the use of the statistical results database is not restricted thereto, and is particularly applicable to other empirically-based methods such as CART referred to above.

Each of the input ranges is divided in a plurality of discrete regions and the input variable is henceforth described in terms of the discrete regions into which it has been divided, for in input variables, the input space is now describable as a series of n-dimensional vectors which as a whole cover all input combinations. Each vector entry preferably has a corresponding series of results, so that an average can be taken of the corresponding results to produce an average for the vector. Annealing is preferably carried out to improve the precision of the process.

The vectors thus produced are incorporated into a lookup table for control of the process and the process is controlled by reference thereto for selection of the best recipe to control the process. Such a best recipe is searched for which differs from a current recipe in that the output is more favorable (meaning closer to the target value), the measurable variables are the same and only the controllable variables differ.

In a preferred embodiment, once the system begins to operate using data obtained according to the above procedure, actual process data is obtained. The actual data may be steadily accumulated into the database or the user may prefer to wait for a period of time until he has a statistically significant quantity of data.

In the following example, use of the invention for improving the yield in a semiconductor manufacture process, is described.

In the process, a silicon wafer is sharpened, that is to say an outer layer, perhaps an oxide layer, is removed.

the process involves the following input parameters:

The thickness of the wafer before the process starts

The temperature of the machine while sharpening.

The pressure within the machine whilst sharpening.

The process has a single output parameter, namely the thickness of the wafer following processing.

The aim of applying the above-described embodiment to the process is to achieve a precise thickness at the end of the precess although the relationship between the process's parameters result are initially unknown.

According to the DOE methodology a model type is selected. A number of experiments is set and input values for each of the experiments are calculated. Then mathematical regression is used to calculate a model, such as the following:

ThicknessAfter=0.2*ThicknessBefore−0.09*Temperature+1.45*Pressure−38

Using this model we now build a lookup table according to the POEM algorithm.

In the POEM algorithm each input variable is firstly divided into sub-intervals, for example:

TABLE 2

Division of Input Ranges Into POEM Discrete Units

| Variable Name | Interval | Number of Sub-Intervals | Sub-Intervals |
| --- | --- | --- | --- |
| Thickness | 300–650 | 4 | A: 300–387.5 |
| | | | B: 387.5–475 |
| | | | C: 475–562.5 |
| | | | D: 562.5–650 |
| Temp | 200–400 | 2 | A: 200–300 |
| | | | B: 300–400 |
| Pressure | 68–97 | 3 | A: 68–77.6 |
| | | | B: 77.6–87.3 |
| | | | C: 87.3–97 |

The input space now comprises a series of the possible combinations of the input sub-intervals. Each combination is written as a vector and each of these input vectors defines a finite region of the input space.

For each vector, the model (the formula) is now used to calculate a corresponding predicted output value of the process.

In applying the model to each vector, preferably a mid-point in the vector is taken to apply values to the formula. A results set as follows may be produced.

TABLE 3

POEM Results Set Using DOE Data

| Input Vector {Thickness, Temp, Press} | Center of the Vector Space, used as input to the DOE model | Predicted output according to the DOE model |
| --- | --- | --- |
| {A, A, A} | {343.75, 250, 72.8} | 113.8 |
| {A, B, C} | {343.75, 350, 92.15} | 132.9 |
| {D, A, C} | {606.25, 250, 92.15} | 194.4 |

In the wafer example, for the inputs given, the table may contain 4*2*3 =24 cells in the lookup table.

From now on, APC may proceed in the normal way using the POEM methodology as if the vector set represents genuine empirical information.

While using the synthesized data for APC, every run of the process provides experimental data for collection which is genuinely empirical. The data being collected can be used for improving the prediction ability of the empirical method that is being used.

As a rule, the prediction ability of an empirical model improves as the amount of observed data increases.

Updating of the data set from DOE data to genuine empirical data is shown for purposes of example in conjunction with POEM methodology, but the skilled person will be aware that it may be implemented for any other empirical method.

Returning to the above example of wafer sharpening and as previously mentioned with reference to table 3, a POEM lookup table was created using data from the DOE formula.

Table 3 is here partly repeated for convenient reference:

TABLE 3

Partially Repeated for Convenient Reference

| Vector {Thickness, Temp, Pressure} | Predicted output according to the calculated (DOE) model |
|---|---|
| {A, A, A} | 113.8 |
| {A, B, C} | 132.9 |
| {D, A, C} | 194.4 |

Actual results obtained during running of the process are preferably stored in a separate but corresponding table, exemplified by Table 4 below.

TABLE 4

Empirical Results

| Values: {Thickness, Temp, Pressure} | Observed output result |
|---|---|
| {604, 260, 93} | 193.8 |
| {580, 225, 89} | 192.1 |
| {634, 290, 93} | 195.0 |

The above three sets of values are values which belong to the {D,A,C} vector group of table 3 above. In each case, all of the results corresponding to each respective input vector are taken and an average or equivalent statistic calculated. As there are now a number of observed results that belong to the same input vector in the lookup table, it is possible to update the 'output' column belong to that vector to be the average of the respective observed results. In this case the average may be calculated as follows:

$$\frac{193.8 + 192.1 + 195}{3} = 193.6$$

which differs slightly from the previous expected output (194.4) obtained using DOE.

In addition to POEM there are many other empirically based mathematical systems that may be used. Furthermore there are numerous methods, in addition to those already described, for incorporating newly obtained empirical data into the model, for example, when obtaining information, it is possible to enter the data directly into the current lookup table. Alternatively it is possible to wait until a statistically significant sample has been obtained before altering the look up table. In deciding when to incorporate newly obtained empirical data it should be borne in mind that the result of a single process may be unrepresentative, and it is preferable to avoid using questionable, that is not statistically meaningful data in the look up table. The lookup table is being used directly to control the process and thus use of statistically questionable data could, as a worst case, lead to instability in the process being controlled.

In a preferred embodiment of the present invention an APC is able to switch automatically between DOE data with empirical data. Not only is it able, as described above, to replace DOE data with empirical data when there is statistically significant empirical data to be used, but additionally or alternatively, it is able to detect wandering of the actual process outputs from the predictions of the lookup table. Preferably the amount of wandering is tested for statistical significance. Additionally or alternatively it is tested against a threshold. The threshold may be a statistical threshold. If the process is found to have wandered beyond acceptable limits then the current empirical data may be discarded and the DOE process is begun again. Following the building of a DOE based look up table a new set of empirical data is obtained.

In a further embodiment instead of beginning the DOE process again, a previously obtained DOE formula is reverted to.

In a further embodiment of the present invention, alternative DOE and empirical processes are built into an APC device. The device is installed and automatically sets itself to carry out a DOE set of predetermined experiments as described above in an initial learning process. Data obtained from the formula is then automatically made into a lookup table as described above, with user intervention and used for APC during a secondary learning process. During the secondary learning process empirical data is obtained, again automatically, and incorporated into the lookup table in one of the ways described above to replace the DOE data in a final phase in which, preferably, learning continues to occur as the empirically obtained data is continuously updated in the light of more recent results. Additionally, the embodiment may incorporate automatic return to DOE following significant wandering of actual results from predicted results, as described above.

In the above pre-installed embodiment, preferably the process type is known and thus the model type, linear, quadratic etc may be preset. Thus the maximum user intervention that is necessary is preferably arranging the settings for the DOE defined experiments.

Figure 8:
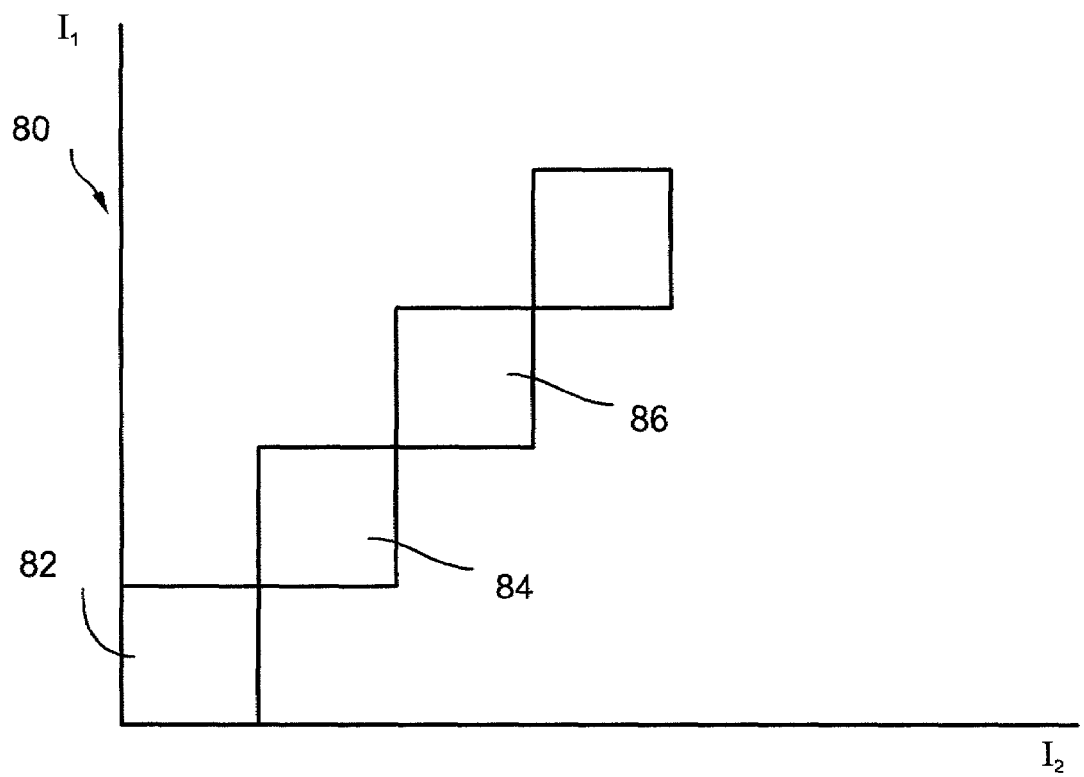
FIG. 8 is a simplified graph showing evolutionary operation of DOE over an input space.

Reference is now made to FIG. 8, which is a simplified graph of a two-dimensional input region 80, illustrating a mode of using DOE known as evolutionary operation. Two inputs $I_1$ and $I_2$ define between them a total input space 80 Within the total input space 80, a smaller input region 82 is used in a first set of DOE experiments. The smaller region 82 may have been chosen because it is believed to produce the best results or because it is easiest to run experiments in this region or because resources for carrying out the experiments are limited, or for any other reason. In particular, a reason may be a decision on methodology of searching the input area since carrying out DOE on the total area 80 may not detect, or may not be good at detecting, subtle variations in output in localized parts of the region 80.

DOE results for input region 82 are thus obtained and used in the normal way. Later on, perhaps because unsatisfactory outputs are achieved, it is then decided to investigate a second, preferably contiguous region 84. The second region 84 may yield results which are better, worse or indifferent. If the results are better then it will be clear that region 84 is a better region within which to run the process than region 82. Furthermore, if there is an improvement in yield when moving in the direction of region 84, then it makes sense to investigate further regions contiguous to region 84. For example, region 86 may be searched. Again, if region 86 produces an improved yield then it makes sense to investigate further regions contiguous to region 86, such as region 88, until no further improvement in the yield is found.

It will be appreciated that the investigation of contiguous regions is susceptible to ending at a local maximum, and thus in a preferred embodiment investigation is not limited to contiguous regions. A disadvantage of this approach however is in the cost of an increased number of experiments.

Reference is now made to FIGS. 9–13 which are graphs of typical input regions for DOE analysis. The graphs illustrate the experiment placing strategies that DOE uses in order to obtain meaningful information about the input space.

Figure 9:
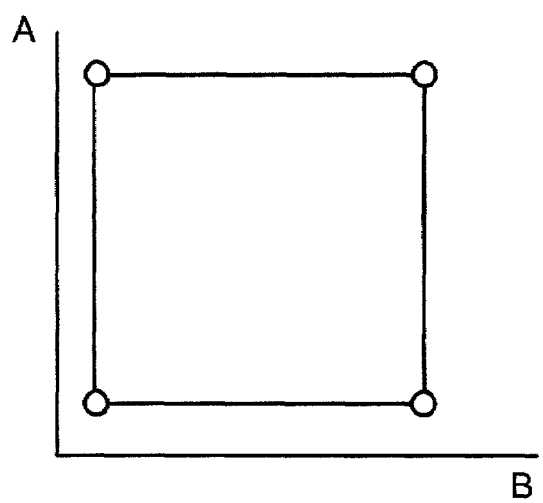
FIGS. 9–13 are simplified graphs illustrating DOE rules for defining the numbers and contents of experiments and showing respectively two level two factor three level two factor, three level three factor, two level two factor central composite design and three level two factor central composite design.

FIG. 9 shows a simple two-input system. The A and B axes represent the two inputs and a square 90 represents the input space that is of practical interest to the experimenters. For each input, experiments, indicated by circles 92, are carried out for minimum and maximum levels of that input. A total of four experiments is carried out to obtain what is known as a 2-level full factorial result that is to say two levels for each input.

Figure 10:
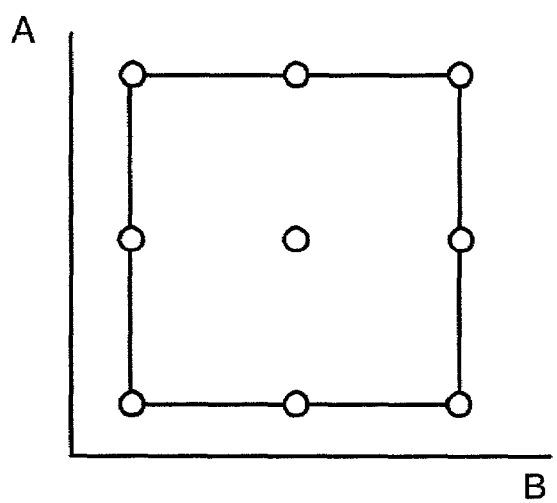

Reference is now made to FIG. 10, which is the same as FIG. 9 except that three levels are studied for each one of two inputs to give a three level full factorial result. In general, for K level full factorial the number of experiments needed is $K^n$, where n is the number of inputs or factors. As will be appreciated, the input conditions for each experiment are as defined by its position in the graph.

As well as full factorial combinations, it is also possible to use fractional factorial combinations. A factional value is selected such as ½, and this enables a significant decrease in the number of experiments at the cost of losing information regarding interactions between the different inputs or factors.

Figure 11:
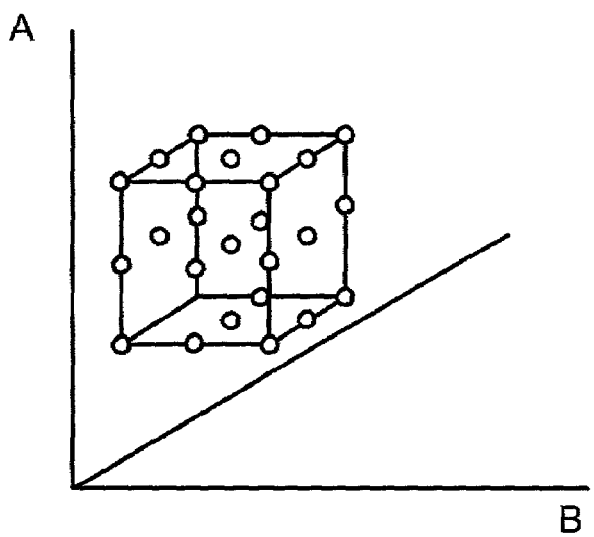

Reference is now made to FIG. 11, which is a graph showing a three level full factorial design for three inputs. A total of $3^3=27$ experiments are recommended under evenly distributed input conditions.

Figure 12:
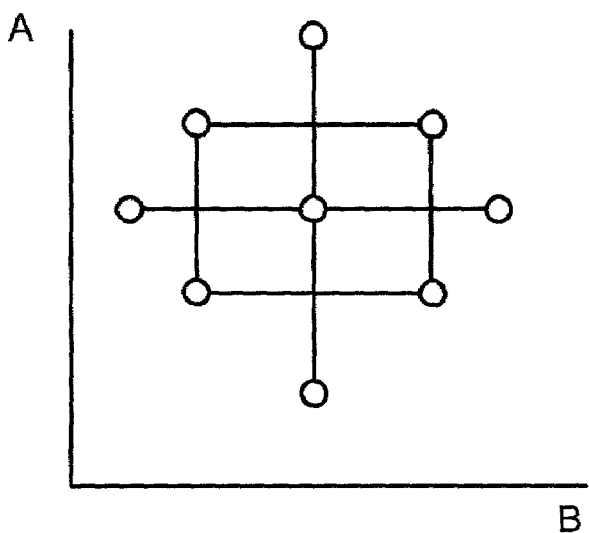

Reference is now made to FIG. 12, which is a simplified graph showing what is known as central composite design (CCD). CCD id efficient for calculating quadratic models, and comprises taking experimental points calculated according to the full or partial factorial model as required, and adding to this a center point and two radial or star points for each factor.

In a preferred embodiment, instead of taking a single center point, two centrally located points are selected.

Figure 13:
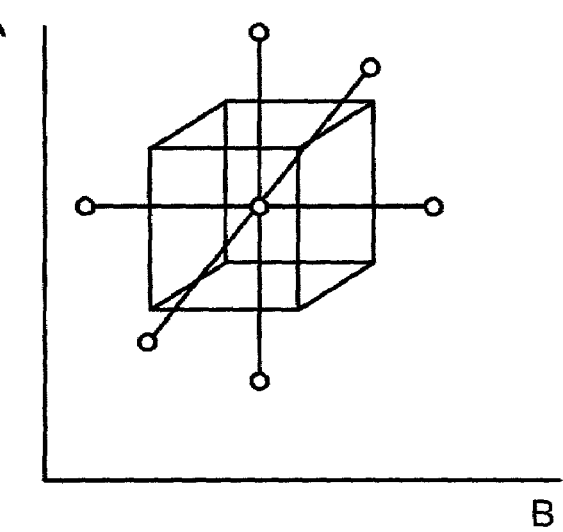

In FIG. 12 which has two factors, four radial points are taken, and in FIG. 13, which shows the equivalent case for three factors, six radial points are taken.

DOE thus preferably provides an orthogonal array of points geometrically arrange over the input space. The arrangement may be such as to cover the input space evenly or may use a CCD arrangement. If a boundaries only version such as that of FIG. 9 is used for a linear model, it is recommended to take two central points as well to conform that the process is in fact linear.

In carrying out DOE it may be borne in mind that the more experiments that are carried out the more accurate the resulting model may be expected to be, on the other hand the longer and more expensive the experimental setup stage becomes. Thus a DOE routine attempts to strike a balance between accuracy and efficiency in selecting the number of experiments. Furthermore the user may choose not to carry out some of the recommended experiments. Generally, it will still be possible in such a case to generate a model, although accuracy will be lost.

According to the above-described embodiments, APC methods using a process model for control, and requiring empirical data to build the model, which data is difficult, expensive or time consuming to obtain, may be fed with useful data after a minimal number of experiments in a reduced learning period, using rigid experimental design techniques such as DOE. Embodiments may gradually or otherwise replace the calculated data with actual empirical data as it becomes available and certain preferred embodiments may revert to existing or newly obtained DOE data when it becomes apparent that a process being controlled has wandered from an existing process control model.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A system for automatic in-process optimization of a process having an input-space comprising input boundaries from a system-initiated empirical model, the system comprising:
   a measurement unit for measuring outputs of the process at points of the input spaced;
   a-selector, for selecting points of the input space such as to maximize information about the input space from a predetermined number of said points, at which to carry out measurements, wherein said selected points are orthogonally arranged in the input space within which the process is operable;
   a controller being operable to control said process to produce respective measured outputs at ones of selected points; and
   a regressor for using said measured outputs to obtain a predictive model of the process configured to produce predicted outputs over the input space by regression from said measured outputs, the controller subsequently using said predictive model to provide in-process optimization of said process.

2. A system according to claim 1, wherein said predictive model comprises a flint formula describing the process.

3. A system according to claim 2, wherein said points comprise at least input boundaries of the process.

4. A system according to claim 3, wherein said points comprise further desired points across the input space.

5. A system according to claim 4, wherein said points are definable by a geometric spacing across the input space.

6. A system according to claim 5, wherein said geometric spacing is selectable to give an even spread of points across the input space.

7. A system according to claim 5, wherein said geometric spacing is selectable to cover at least the input boundaries and a center of the input space.

8. A system according to claim 5, wherein said geometric spacing is in accordance with DOE predetermined placing rules.

9. A system according to claim 2, wherein said predictive model is selected from the group consisting of a linear formula, a linear formula with interaction between inputs, a quadratic formula and a quadratic formula with interaction between inputs.

10. A system according to claim 1, wherein the input space is divisible into discrete regions;
wherein said predictive model comprises predicted outputs associated with each discrete region; and
wherein said predictive, model is configured to return, for a given discrete region, both said predicted outputs and actual outputs measured for said given discrete region when the continuous process is running, thus improving the quality of outputs returned.

11. A system according to claim 1, further having an empirical results quantity assessor for interchanging predicted outputs with actual outputs when said actual outputs are assessed to be statistically significant according to at least one predetermined criterion of significance.

12. A system according to claim 1, having a prediction quality assessor for interchanging said actual outputs with said predicted outputs when said predicted outputs are assessed to diverge significantly from an outcome of the process according to at least one predetermined criterion of significance.

13. A system for automatic in-process optimization of a process using a system-initiated model, comprising:
controller;
a process model using data, said data including inputs and correspondingly mapped predictive outputs, the model configured with a process control unit to optimize a process by selecting inputs mapped on to a desired output and to set said inputs as operating points for said process, wherein said operating points are orthogonally spaced in an input space within which the process is operable;
a data model for generating data for said process model; and
an empirical data extractor for extracting empirical data from the process for insertion into said controller;
wherein said process model is configured to use said generated data and said empirical data interchangeably in order to carry out said in-process optimization of said process.

14. A system according to claim 13, further comprising a prediction quality assessor for interchanging results obtained by said extractor with results obtained from said data model when a prediction of said process model is assessed to diverge significantly from an outcome of the process according to at least one predetermined criterion of significance.

15. A system according to claim 13, further comprising an empirical results quantity assessor for interchanging results produced by said data model with results obtained by said extractor when results obtained from running the process are assessed to be statistically significant according to at least one predetermined criterion of significance.

16. A system according to claim 13, wherein said process model is a lookup table.

17. A system according to claim 16 wherein said lookup table comprises output values for discrete regions of an input space within which the process is operable.

18. A system according to claim 13, wherein said data model is a formula obtainable from outputs of the process associated with said orthogonally spaced points.

19. A system according to claim 18, wherein said formula is selected from the group consisting of a linear formula, a linear formula with interactions, a quadratic formula and a quadratic formula with interactions.

20. A system according to claim 13, wherein said orthogonally spaced points are evenly distributable about said input space.

21. A system according to claim 13, wherein said orthogonally spaced points comprise points placed on the boundaries of said input space and a point placed at a center of said input space.

22. A method of automatic in-process optimization of a process, using an empirical model, said empirical process model connecting process inputs with predicted process outputs, the method comprising the steps of:
generating data from experimental operation of the process for the process model using a data generation formula; and
carrying out in-process optimization of the process using said generated data within the process model by setting inputs in accordance with a desired output; and
wherein the process inputs lie within an input space and said data is obtained by said experimental operation of the process, said experimental operation comprising running the process at preselected points in said input space; and
wherein said preselected points are orthogonally placed in said input space using said data generation formula.

23. A method according to claim 22, wherein said preselected points are evenly spaced in said input space.

24. A method according to claim 22, wherein at least some of said preselected points are placed at boundaries and a center of said input space.

25. A method according to claim 22, further comprising a step of replacing said generated data with data empirically obtained during the running of the process.

26. A method according to claim 25, wherein said step of replacing said generated data is carried out when said empirically obtained data has reached a threshold or significance according to at least one predetermined significance criterion.

27. A method according to claim 25 further comprising a step of reverting to said generated data using a data generation formula.

28. A method according to claim 27, wherein said step of reverting is carried out when results predicted by the data-based process model are detected to diverge from empirically measured process results by an amount exceeding a threshold of significance according to at least one predetermined significance criterion.

29. A method according to claim 22, comprising the steps of
building a formula for a first input space,
obtaining process output data for said first input space,
building a formula for a second input space,
obtaining process output data for said second input space,
comparing said process output data for said second input space with process output data for said first input space,
on the basis of said comparison selecting a third input space for obtaining process output data,
and operating said process in an optimal one of said input spaces.

* * * * *